United States Patent [19]

Smith et al.

[11] Patent Number: 5,807,812
[45] Date of Patent: Sep. 15, 1998

[54] CONTROLLED GEL BREAKER

[75] Inventors: Kevin W. Smith, McMurray; Todd R. Thomas, Wexford, both of Pa.

[73] Assignee: Clearwater, Inc., Pittsburgh, Pa.

[21] Appl. No.: 833,727

[22] Filed: Apr. 9, 1997

Related U.S. Application Data

[63] Continuation-in-part of Ser. No. 548,646, Oct. 26, 1995.

[51] Int. Cl.$^6$ .............................. E21B 43/16; E21B 43/26
[52] U.S. Cl. ........................ 507/238; 507/922; 507/923; 166/283; 166/307
[58] Field of Search ..................................... 507/238, 254, 507/902, 906, 921, 922, 923; 252/315.4; 166/283, 307

[56] References Cited

U.S. PATENT DOCUMENTS

| | | | |
|---|---|---|---|
| 2,675,354 | 4/1954 | McChrystal et al. ................... | 507/263 |
| 2,793,996 | 5/1957 | Lummus ................................. | 507/138 |
| 2,946,748 | 7/1960 | Steiner .................................... | 422/171 |
| 2,965,566 | 12/1960 | Hoeppel .................................. | 507/137 |
| 3,505,374 | 4/1970 | Monroe .................................. | 260/439 |
| 3,749,173 | 7/1973 | Hill et al. ............................... | 166/291 |
| 3,990,978 | 11/1976 | Hill ......................................... | 507/235 |
| 4,003,393 | 1/1977 | Jaggard et al. .......................... | 137/15 |
| 4,104,173 | 8/1978 | Gay et al. ............................... | 507/238 |
| 4,153,649 | 5/1979 | Griffin, Jr. .............................. | 260/950 |
| 4,174,283 | 11/1979 | Griffin, Jr. .............................. | 507/203 |
| 4,200,539 | 4/1980 | Burnham ................................. | 507/238 |
| 4,200,540 | 4/1980 | Burnham ................................. | 507/238 |
| 4,316,810 | 2/1982 | Burnham ................................. | 507/238 |
| 4,507,213 | 3/1985 | Daccord et al. ........................ | 507/238 |
| 4,622,155 | 11/1986 | Harris et al. ............................ | 507/238 |
| 4,781,845 | 11/1988 | Syrinek et al. ......................... | 507/238 |
| 4,795,574 | 1/1989 | Syrinek et al. ......................... | 507/238 |
| 5,110,485 | 5/1992 | Huddleston ............................. | 507/238 |
| 5,271,464 | 12/1993 | McCabe .................................. | 166/295 |
| 5,307,877 | 5/1994 | Cowan et al. .......................... | 166/295 |
| 5,417,287 | 5/1995 | Smith et al. ............................ | 166/308 |
| 5,571,315 | 11/1996 | Smith et al. ............................ | 623/166 |
| 5,649,596 | 7/1997 | Jones et al. ............................. | 166/300 |

OTHER PUBLICATIONS

Martin Marietta specification sheets for "MagChem 10", MagChem 20, MagChem 30, MagChem 35, MagChem 40, and MagChem 50 Jan. 1995.

*Primary Examiner*—Shean C. Wu
*Attorney, Agent, or Firm*—William L. Krayer

[57] ABSTRACT

Hydrocarbon fracturing fluids are made by combining organic phosphate esters with polyvalent metal salts in hydrocarbon carriers to form gels; breaking of the gel is retarded or otherwise controlled over a wide range of water concentrations, through the use of slowly soluble alkaline earth metal compounds, preferably hard burned magnesium oxide, which may be added along with the gel component. The slowly soluble alkaline earth metal compound is employed together with an oily acid breaker retarding agent such as tall oil.

19 Claims, No Drawings

CONTROLLED GEL BREAKER

RELATED APPLICATION

This application is a continuation-in-part of our U.S. patent application Ser. No. 08/548,646, filed Oct. 26, 1995, entitled "Delayed Breaking of Gelled Hydrocarbon Fracturing Fluid".

TECHNICAL FIELD

This invention relates to the use of hydrocarbon gels in formation fracturing and otherwise in the recovery of hydrocarbons from subterranean formations. In particular, hydrocarbon gels used in formation fracturing are made to include alkaline earth metal compounds which will dissolve slowly and propitiously under the influence of small amounts of water and ambient downhole temperatures. Suitably slowly soluble alkaline earth metal compounds, such as magnesium oxide, dolomite, and lime, are used; the preferred composition is hard burned magnesium oxide, i.e. magnesium oxide treated with heat to reduce its surface area and solution rate.

The slowly soluble gel breakers may be further modified by including with them one or more rosin acids, fatty acids, or other long chain or polycyclic acids, which retard the action of the gel breaker.

BACKGROUND OF THE INVENTION

Polyvalent metal salts of orthophosphate esters have been used for years to create high viscosity gels in hydrocarbons such as crude oil, kerosene, Diesel oil and the like which are then used in formation fracturing. The wellbore is cemented and fitted with a casing, the casing is perforated to permit a fracturing fluid to pass into the formation, and then the fracturing fluid, in this case the gelled hydrocarbon carrying a proppant, is forced into the casing under pressure great enough to cause fractures in the formation, thus providing fissures for the passage of the hydrocarbons to be recovered. Good descriptions of these processes, specifically utilizing aluminum salts of the orthophosphate esters, may be found in the following patents: Griffin U.S. Pat. No. 4,174,283, Burnham and Tiner U.S. Pat. No. 4,200,539, Burnham U.S. Pat. No. 4,200,540, Burnham U.S. Pat. No. 4,316,810, and Harris, Hottmeyer and Pauls U.S. Pat. No. 4,622,155. Fracturing processes utilizing iron compounds in combination with similar orthophosphate esters are described by Monroe in U.S. Pat. No. 3,505,374 and Smith and Persinski in U.S. Pat. No. 5,417,287.

The gelled, viscous hydrocarbon fracturing fluid is excellent for its ability to carry proppants and place them in the fissures created by the fracturing process, where the proppants remain during production procedures. Efficient production requires that the gel should be broken, i.e. the viscosity reduced so the hydrocarbons to be recovered can pass through the fissures with the proppants in place.

Little is said in the above cited patent literature about breaking the gel, although it is implicit in the chemical structure of the gelling agent that it is not characterized by a strong chemical bond. Typically, a strong base such as soda ash or sodium bicarbonate is added in solid form along with the gel components at the time of their addition to the hydrocarbon fracturing fluid. The caustic or other material does not act immediately to break the gel because of the normally very low water content in the fracturing fluid. Thus, the conventional system relies on low water content to delay dissolution of the caustic and to preserve the gel long enough to permit a good fracturing procedure; on the other hand, if there is not enough water contamination from the formation or elsewhere, a small amount of water, perhaps in the range of about 1000 ppm, is added to assure the ability of the caustic to neutralize the gel. Where the fracturing personnel can be certain there is less than 1000 ppm water available to the system, gel breaking can thus be controlled to some extent by controlling the water concentration, but all too frequently much higher concentrations of water enter the system from uncontrolled sources such as the fracturing fluid tanks, blender tubs, the fracturing fluid itself, "heels" in tanks, and unanticipated downwell sources. The higher concentrations of water cause the immediate distribution and activation of the caustic, exposing it to the polyvalent metal, thus neutralizing and breaking the gel prematurely. When the gel is broken before completion of the fracturing process, the fracturing process is ineffective; in particular, when the gel does not have the strength to carry the proppant, the proppant is poorly distributed.

Another difficultly controlled variable in the conventional hydrocarbon gel fracturing and gel breaking process is that the soda ash normally used in the process may contain a range of particle sizes including relatively large particles which can be ground in an attempt to control their size, but which in any event are further reduced in size to a relatively uncontrolled extent by attrition during the injection process, e.g. when passing through the pumps and traversing the well bore under great pressure and turbulence. The operator has little control of the size of the soda ash at the point of effect, and in fact normally has no way of monitoring it. It is not desirable to introduce very small pieces, since their high surface area renders them likely to dissolve completely on contact with water, resulting in premature destruction of the gel. Thus the surface area and dissolved concentration of the alkali metal hydroxides are variables which are extremely difficult for the operators to control.

Calcium hydroxide is mentioned as a gel breaker which "functions slowly" by Hill, Smith and Kucera in U.S. Pat. No. 3,749,173 (col 3, line 51), but this patent does not deal with fracturing and no guidance is given as to the delayed action required in a fracturing process.

There is thus a need for a method of avoiding premature gel breaking and for controlling the process of gel breaking of hydrocarbon fracturing fluids only to take place after the fracturing process is completed, regardless of the amount of water present.

SUMMARY OF THE INVENTION

In accordance with our invention, slowly soluble alkaline earth metal compounds are used as gel breakers in gelled hydrocarbon fracturing fluids. Because they are slowly soluble even at high downhole temperatures, their action is delayed even if the gelled hydrocarbon fluid is exposed to a large amount of water. Thus, even in the presence of unexpectedly high concentrations of water, our hydrocarbon gel fracturing fluids will not break prematurely.

While we may use natural magnesium and calcium compounds such as lime and dolomite, we prefer to use magnesium oxide which has been heat-treated to obtain a surface area of no more than about 5 $m^2/g$ and most preferably 0.3 to 0.8 $m^2/g$, as will be explained below. Further, we prefer magnesium compounds to calcium compounds because they are ultimately more soluble than the calcium compounds and less likely to generate pH's higher than about 9; they are thus less likely to cause scale.

In a more preferred version of our process, the gel breaker is accompanied by one or more fatty, rosin, or other long chain acids, most preferably with tail oil, which typically contains about 50–60% fatty acids and about 34–40% rosin acids, the balance, if any, being unsaponifiable matter. Although we do not intend to be bound by any theories, it is possible the acids tend to cling to and react with the alkaline earth metals available on the surface, thus blocking access of water to the parts of the gel breaker particles most vulnerable to attack by itinerant or ambient water.

DETAILED DESCRIPTION OF THE INVENTION

The invention includes methods and compositions for fracturing subterranean formations and preparing them for production through a well bore. The compositions are fracturing fluids comprising a liquid hydrocarbon carrier, a polyvalent metal salt of a phosphoric acid ester, a proppant, and a gel breaker. As will be described further below, the gel breaker (particularly an alkaline earth metal compound) may be accompanied by an oily acid gel breaker retarding agent. The methods include methods of fracturing formations using such compositions, and methods of breaking hydrocarbon gels, particularly wherein the breaking action is retarded.

The hydrocarbon carriers, or base fracturing fluids, are well known in the art and include crude oil, Diesel oil, various lubricating oils, kerosene, and the like. The purposes of the fracturing fluid are two-fold—upon injection under great pressure down the well bore and through perforations in the well casing, it fractures the formation, and it carries with it small particles of relatively hard or strong material such as sand to serve as a proppant to keep the fissures open after they are formed by fracturing. The function of carrying the proppant particularly has been found to be better performed if the hydrocarbon fluid is provided with a high viscosity, or gel. It will be understood throughout the present discussion that the proppant, which may be sand, glass beads, ground walnut shells, synthetic resin particles, or any small particulate capable of maintaining an effective fissure opening, may be present in our fracturing fluids/gels in amounts from a pound or less per gallon to several pounds, i.e. twenty or more pounds per gallon; the amount of proppant used is generally a matter of discretion for the operators.

Gelling components of our compositions are polyvalent metal salts of orthophosphate esters. These are preferably made at the wellhead site by adding the orthophosphate ester and a polyvalent metal salt (preferably an inorganic iron or aluminum salt) separately to the hydrocarbon fracturing fluid, as is known in the art. See the above cited Monroe et al, Griffith, Burnham et al, and Smith et al patents, which are incorporated herein by reference. As is also explained in the Harris et al U.S. Pat. No. 4,622,155 cited above and also incorporated herein by reference, the salts formed can be expressed:

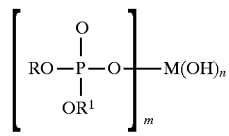

where R is a straight or branched chain alkyl or an aryl, alkoxy or alkaryl group having about 6 to 18 carbon atoms and $R^1$ is hydrogen or aryl, alkaryl, alkyloxy, or alkyl group having up to about 18 carbon atoms, M is a polyvalent metal selected from aluminum and iron, m is a number from 1 to 3, n is 0–2, and the sum of m and n is 3. More generally, the iron or aluminum phosphate esters we use may be described as iron or aluminum salts of phosphate ester gelling agents having about 6 to about 36 carbon atoms (where the enumeration of the carbon atoms is based on a single phosphate ester moiety, bearing in mind that where m is 2 or 3, the total number of carbon atoms may be higher than 36).

As is known in the art, where M is aluminum, it is commonly introduced by way of a basic aluminum compound such as sodium aluminate, aluminum isopropoxide or hydrated aluminate. As reviewed in Burnham's U.S. Pat. No. 4,316,810 (col 5, lines 52–60), a preferred ultimate source of aluminum is sodium aluminate, which is added together with sodium hydroxide to an appropriate phosphate ester. In the case of an iron salt, ferric sulfate is preferred, as described in the above cited Smith and Persinski patent. In either case, the iron or aluminum salt can be added at the wellhead more or less at the same time as the phosphate ester.

It is known also to use more complex iron or aluminum salts such as the reaction product, described by McCabe in U.S. Pat. No. 5,514,645, of an iron or aluminum salt and a $C_{8-18}$ surface active amine. Our gel breakers and gel breaker retarding agents are also contemplated for use when these materials are used to introduce the polyvalent metals to the gel-forming system; our gel breakers, together with the oily acid retarding agents, are also effective in gel systems employing lower molecular weight amines with the phosphate ester as well as with the polyvalent metal, as disclosed in U.S. Pat. No. 5,614,010 by Smith and Persinski, and with the ferric ammonium citrate and related compounds as described by the same inventors in U.S. Pat. No. 5,571,315, and additionally the polycarboxylic acids or their alkali metal salts disclosed in application Ser. No. 08/743,007, now U.S. Pat. No. 5,647,902, by the same inventors. The full disclosures of each of the above Smith/Persinski and the McCabe patents are incorporated herein by reference. The McCabe patent specifically recites the admixing of a source of iron or aluminum sulfate with a $C_{2-4}$ monohydric alcohol such as isopropanol, or other solvent, in an amount from 10 to about 25% by weight. The $C_{8-18}$ surface active amine, which may be an alkyl, alkanol, or alkyl substituted derivation of an N-heterocyclic (preferably an imidazoline such as prepared from the reaction of a tall oil fatty acid with diethylenetriamine) is admixed with the alcohol in an amount from 30 to about 70% by weight. Preferably the iron source is present in an amount from 80–90% and the amine is present in an amount from about 50–60% by weight of the alcohol or solvent. The reaction is effected at temperatures from about ambient to the boiling point of the solvent. Such reaction products of iron are included in our invention within the term polyvalent metal salt. It will be seen from the above that our polyvalent metal may be inserted into the gel by way of a metal, ion, salt, complex or reaction product, all of which may be considered synonymous for my purposes.

As disclosed in the above mentioned Smith and Persinski U.S. Pat. No. 5,571,315, the polyvalent metal ion may also be introduced by way of a ferric ammonium citrate or an alkylamine citrate; ferric alkanol amine citrates may also be used. Suitable examples are those ferric salts which can be made by forming a solution of ferric sulfate and an amine of the formula $R_2NR'$ where $R'$ is an alkyl or alkanol group having from one to six carbon atoms and each R is independently selected from hydrogen, alkyl groups and alkanol groups having from one to six carbon atoms, adding citric acid thereto, and recovering a ferric alkylamine or alkanolamine citrate. Similar compounds may be made using other polycarboxylic acids such as oxalic, succinic, maleic or fumaric, tartaric, suberic, phthalic, isophthalic, terephthalic, malonic, glutaric, adipic, pimelic, azeleic, and sebacic acids, as suggested in the above-mentioned Ser. No. 08/743,007.

In addition, as disclosed in U.S. Pat. No. 5,614,010, a low molecular weight amine of the formula $H_{3-n}N(C_mH_{2m}R)_n$ where n is an integer from 1 to 3, each m is independently an integer from 1–6 and each R is independently H of OH may be used along with an inorganic ferric salt (we may also use an aluminum salt) to provide the polyvalent metal ion for gel formation with the phosphate ester.

The phosphate esters are, in turn, prepared by the known reaction of a phosphorous compound such as phosphorous pentoxide with an alcohol having the desired alkyl or other groups defined by R and R, as recited in the above formula I. Such reactions may result in mixtures of phosphate esters having different carbon-containing constituents. Mixtures of alcohols may of course be used to react with the phosphorous pentoxide or other suitable phosphorous compound. When the sodium aluminate or other aluminum compound is reacted with the phosphate ester, a mixture of aluminum phosphate ester salts will follow. Such mixtures are usable in our invention as are mixtures of iron phosphate ester salts. We may use any of the conventional polyvalent metal salts of phosphate esters which have been commonly used in the art of gelling hydrocarbon fracturing fluids. As noted by McCabe in U.S. Pat. No. 5,271,464 (col 2, lines 21–34)), the phosphate ester to be reacted with a polyvalent metal salt to form a gel has the general formula

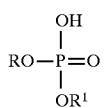

where R and R' are as defined above.

Our preferred gel breaker is a hard burned magnesium oxide of a particle size which will pass through a 200 mesh Tyler screen, having a surface area of less than 5 square meters per gram, preferably 0.3 to 0.8 $m^2/g$, and an ignition loss no greater than 0.5%. Commercially available hard burned magnesium oxide is generally made from magnesium hydroxide which is first heated to about 350° C. to dehydrate it. The magnesium hydroxide is in turn commonly made from natural sources such as dolomitic lime, which is treated to separate calcium chloride from magnesium hydroxide.

By hard burned, we mean that it is heated or calcined at temperatures of about 1100° to 1300° C. to obtain the desired surface area. The manufacturer's reported ignition loss is generally inversely related to the activity index used by manufacturers. See, for example, the specification sheets for MAGCHEM 10, MAGCHEM 20, MAGCHEM 30, MAGCHEM 35, MAGCHEM 40, and MAGCHEM 50 of Martin Marietta which are submitted with the Information Disclosure Statement for the present application and fully incorporated by reference. That is, the low loss on ignition is correlated to a high activity index, meaning the time required for reactivity is long. No activity index (which is a time measure of a phenolphthalein end point) is reported on the specification sheet for MAGCHEM 10 because it is quite long and difficult to measure; accordingly we have found we can correlate "slowly soluble" as applied to our preferred hard burned magnesium oxide to the loss on ignition and/or the surface area. Persons skilled in the art will recognize, however, that "slowly soluble" includes other alkaline earth metal breakers which have the desired effect of delayed breaking of the gels described herein. Even in cases where large amounts of water are present, the magnesium or other alkaline earth metal of our invention will not be immediately present for gel breaking prematurely in large quantities as is the case with sodium hydroxide. A suitable commercial material of our preferred type is technical grade magnesium oxide made by Martin Marietta and designated "MAGCHEM 10."

Other alkaline earth materials suitable for use in the invention include hard-burned dolomite, lime, dolomitic lime, and brucite having absolution rate in the same range as hard burned magnesium oxide. If a naturally occurring dolomite, lime or brucite does not have such a solution rate (most do not), heat treating or calcining may be employed to convert it to the appropriate physical properties, particularly a surface area of less than 5 $m^2/g$ and/or an ignition loss no greater than 0.5%. Temperatures for hard burning these materials may vary somewhat from those of hard-burned magnesium oxide—specifically, dolomitic limestone may be commercially calcined at 750°–850° C. and hard-burned at 900°–1200° C.; limestone may be calcined at 950°–1000° C. and hard-burned at 1000°–1300° C. We may refer to any such hard-burned alkaline earth metal compound (particularly oxide) which has a surface area less than 5 $m^2/g$ and/or an ignition loss no greater that 0.5% as controlled solution rate alkaline earth metal compounds or slowly soluble gel breakers useful in our invention.

Our process is further improved by accompanying the alkaline earth metal compound gel breaker with one or more rosin acids, fatty acids, or other long chain or polycyclic acids (collectively called sometimes herein "oily acid retarding agents"), which may become fixed to the surface of the gel breaker particles by reaction with the alkaline earth metals therein or otherwise hinder the action of the gel breaker. Our preferred oily acid retarding agent is tall oil, which typically contains 50–60% fatty acids and about 34–40% rosin acids. A prominent suitable rosin acid is abietic acid; this polycyclic acid, also known as sylvic acid, and its isomers are suitable for my purposes and are included in the description "oily acid retarding agents", as are other, less complex acids which can be used such as capric acid, lauric, myriatic, palmitic, linoleic, stearic, oleic, arachidic, arachidonic, behenic, and lignoceric. Generally any rosin acid, fatty acid, or other oily acid coating agent having from about ten to 26 carbon atoms may be used.

The process of fracturing a well is carried out after the well has been fitted with a casing, cemented, and perforated as is known in the art. The gel breaker is added along with the phosphate ester and the polyvalent metal salt as described herein. No particular order of addition is necessary. Generally, the phosphate ester is added at concentrations of about 0.1 to about 1.2%, the aluminum or iron salt is added at concentrations of about 0.1 to about 1.2%, and the gel breaker is added at concentrations of two to about fifteen pounds of gel breaker per thousand gallons of fracturing fluid. Thus the phosphate ester salt which is formed by the phosphate ester and the metal salt together are added at concentrations of 0.2 to 2.4% of the fluid. Higher amounts may be used within the scope of our invention but normally the additional benefits may not be commensurate with the expense, and indeed too much gelling agent can have adverse side effects as is known in the art.

The efficiency of our invention is virtually independent of the amount of ambient water present in the wellbore and surrounding formation. Moreover, the amount of gel breaker in relation to the phosphate ester salt is not critical—an amount near the lower end of the range (say, two to five pounds of gel breaker per thousand gallons of fracturing fluid) will ultimately perform satisfactorily if not in optimum time. Amounts in excess of fifteen pounds per thousand gallons are generally superfluous unless high concentrations of gelling agents have been used, and will not adversely affect the process. While we prefer at least about 1000 ppm of water to be available for dissolution of the gel breaker, our invention obviates the problem of premature gel breaking under a wide range of conditions including lesser amounts of water. Even with amounts of water far in excess of 1000 ppm, the slowly soluble gel breakers we use will not immediately break the gel.

The following set of experiments illustrates the effectiveness of our invention.

EXAMPLE 1

300 ml of Diesel oil was placed in a Waring blender. Then 3 ml of a phosphate ester having 10–12 carbon atoms, the breaker (as shown in the table below), water, and 3 ml of a 20% solution of ferric sulfate were added. After addition of the breaker the mixture was blended for two minutes and placed in a roller oven at 150°–160° F. until the gel was broken as determined by visual observation.

| Breaker | % Water Added | Break Time |
| --- | --- | --- |
| 0.72 g Na$_2$CO$_3$ | 0 | 5 hours |
| 0.72 g Na$_2$CO$_3$ | 1 | 3 hours |
| 0.72 g Na$_2$CO$_3$ | 2.5 | no gel |
| 0.72 g Na$_2$CO$_3$ | 5 | no gel |
| 0.75 ml MgO | 0 | 4 hours |
| 0.75 ml MgO | 1 | 4 hours |
| 0.75 ml MgO | 2.5 | 4 hours |
| 0.75 ml MgO | 5 | 4 hours |

The magnesium oxide used was "MAGCHEM 10", a hard-burned magnesium oxide having a surface area of 0.3–0.8 m$^2$/g and a loss on ignition no more than 0.5%. It was used in the form of a slurry containing 8.8 pounds of "MAGCHEM 10" per gallon of butane Diesel oil; the slurry had a density of 14 pounds per gallon. As can be seen by the results, the alkali metal breaker, Na$_2$CO$_3$, is highly responsive to the amount of water present, while the action of the hard burned MgO breaker is substantially uniformly delayed and the delay is independent of the amount of water present. Thus my gel breaker may be said to be capable of controlling the desirable retardation of the gel breaking process.

EXAMPLE 2

Comparative Reaction/Solution Rates

The purpose of this experiment was to elicit accelerated reaction rates of various alkaline earth compounds under conditions otherwise more or less simulative of a downhole fracturing process employing a gelled hydrocarbon as a fracturing agent. As will be explained below, the time consumed for each experiment was a function of the solution rates of the candidates as well as their reaction rates—that is, all the candidates were introduced as solids; in order to change the pH of the mixture, the particles had to dissolve as well as react with the phosphoric acid to reach the desired pH end point. As previously explained, hydrocarbon gels are made with phosphoric acid esters and are viscosified by reaction with polyvalent metal salts. For the sake of accelerating the tests, however, only the hydrocarbon fluid and the phosphoric acid were used; the gelling agent was not formed. In addition, more water was present in the experiment than frequently will be the case in field conditions, in order to speed up the test.

The procedure was: 380 grams of Diesel fuel was placed in a beaker containing a 1000 rpm stirrer; the alkaline earth metal compound to be tested was added and dispersed by the electric stirrer at 1000 rpm for five minutes. A pH probe was then inserted, and 29.8 g of 1N phosphoric acid (387 g 85% H$_3$PO$_4$+water→1000 ml) was added together with an additional 50 ml water. pH readings were begun immediately and continued until the pH in each case became 7.

Results were as follows:

| Alk Earth Material | Amt. | Time for pH7 (min.) |
| --- | --- | --- |
| Soda Ash (<20 mesh) | 13.78 g | 3.8 |
| MAGCHEM 50 lightburn | 5.20 g | 9.4 |
| NaOH pellets ground <10 mesh | 10.40 g | 13.9 |
| MAGCHEM 125 lightburn | 5.20 g | 28.1 |
| Chinese MgO | 5.20 g | 43.3 |
| MAGCHEM 20 | 5.20 g | 60.1 |
| Dolime (as CaO) | 7.29 g | 60.3 |
| Soda Ash (<10 mesh) | 13.78 g | 72.6 |
| MAGCHEM 10 | 5.20 g | 154.4 |
| Hardburned Lime (as CaO) | 10.93 g | 121.5 |
| Hardburned Dolime (as CaO) | 10.93 g | 108.2 |

Notes:
"Dolime" is dolomitic lime - CaOMgO;
"lightburn" means caustic calcined.

Under the conditions of the test, the hardburned lime and hardburned dolime appeared to require more than the molar equivalent of the other alkaline earth metal materials to perform in the test because of the difficulty of dispersion, yet, as may be seen from the results, more than 100 minutes was required for them to achieve the goal of neutralization. Thus, our alternative definition of slowly soluble for our purposes is that, under the conditions of the pH end point test described above, the material in question will require more than 100 minutes to achieve pH7. That is, our slowly soluble gel breakers are alkaline earth metal compounds, particularly oxides, which require more than 100 minutes to achieve a pH of 7 in the above test.

Gel Breaker Retardation Examples

To demonstrate the ability of our additives to retard the breaking of the gel, some comparative tests were run.

EXAMPLE 3

Gels were made in Diesel oil using 1.2% phosphate ester and 1.2% ferric sulfate. In a manner similar to that of Example 1, 0.1 MgO gel breaker was added with good mixing along with the ferric sulfate to provide a control mixture. For the test composition, a test run gel breaker slurry was made comprising 5.5% Diesel oil, 54.5% MgO, and 38.9% tall oil. An amount of this slurry was used to provide an amount of MgO in the gel (taking into account also the overall percentages) equal to that of the control, i.e. 0.1% MgO.

Results

Using a FANN 50 viscometer, at a shear rate of 170 sec$^{-1}$ and a temperature of 194° F., the viscosity of the control was initially 23 cps, reducing to 11 cps in less than 1 hour. The test sample had an initial viscosity of 101 cps, which was reduced to 11 cps at two hours.

A similar comparison was made using oleyl acid in place of tall oil except that the MgO in both the control and the test sample was 0.075% instead of 0.1%. The control was reduced to 17 cps within 1 hour and the oleyl acid containing gel breaker sample was still at 203 cps at one hour. A primary observation, in addition to the fact that reduced viscosity required a significantly longer time for the oily acid-containing material than for the control, was that the initial viscosities of the materials containing the oily acid components were far higher than the controls. Without the oily acid breaking retardation agent, gel breaking action begins very soon and goes to completion within a short time; with the oily acid additive, gel breaking action is delayed significantly throughout its entire time range.

The effectiveness of the oily acid retarding agent will vary with its concentration, a very small amount having a commensurately small effect. We may use almost any amount of retarding agent, but amounts more than about ten times the quantity of gel breaker (MgO) will have little additional economic benefit, and amounts less than about one-tenth the amount of gel breaker, while effective to some degree, will not generally be particularly practical. We prefer to use them in ratios of gel breaker to retarding agent of about 1:0.4 to 1:1.4, more preferably 1:0.6 to 1:1 by weight.

We claim:

1. Composition useful in formation fracturing comprising a hydrocarbon fracturing fluid, a gelling agent comprising an aluminum or ferric salt of a phosphoric acid ester, a proppant, a slowly soluble alkaline earth metal gel breaker, and an oily acid gel breaker retarding agent.

2. Composition of claim 1 wherein said gel breaker is hard burned magnesium oxide.

3. Composition of claim 1 wherein said gelling agent is present in an amount from about 0.2% to about 2.4% of the amount of fracturing fluid, said gel breaker is present in an amount from about 2 to about 15 pounds per thousand gallons of fracturing fluid, and said oily acid gel breaker retarding agent is present in an amount effective to retard the action of said gel breaker.

4. Composition of claim 1 wherein said phosphoric acid ester has about 6 to about 36 carbon atoms.

5. Composition of claim 1 wherein said oily acid gel breaker retarding agent comprises tall oil.

6. A hydrocarbon gel exhibiting retardation in breaking comprising a hydrocarbon selected from the group consisting of crude oil, Diesel oil and kerosene, a ferric or aluminum salt of a phosphate ester having about 6 to about 36 carbon atoms, in an amount sufficient to viscosify said hydrocarbon, about two pounds to about fifteen pounds of a hard burned alkaline earth metal oxide selected from the group consisting of hard burned magnesium oxide, hard burned lime, and hard burned dolomitic lime per thousand pounds of hydrocarbon, and an oily acid gel breaker retarding agent in an amount effective to retard the breaking of said gel by said alkaline earth metal oxide, said amount being in a ratio of said hard burned alkaline earth metal oxide to said oily acid gel breaker retarding agent of about 1:0.4 to about 1:1.4 by weight.

7. A hydrocarbon gel of claim 6 wherein said oily acid gel breaker retarding agent comprises tall oil.

8. A hydrocarbon gel of claim 6 including a proppant.

9. A hydrocarbon gel of claim 6 wherein said hard burned alkaline earth metal oxide and said gel breaker retarding agent are present in a ratio of about 1:0.6 to 1:1 by weight.

10. Composition useful for breaking a hydrocarbon gel formed by an aluminum or ferric salt of a phosphoric acid ester, comprising an alkaline earth metal oxide and an oily acid gel breaker retarding agent.

11. Composition of claim 10 wherein said alkaline earth metal oxide is hard burned magnesium oxide.

12. Composition of claim 10 wherein said oily acid gel breaker retarding agent comprises tall oil.

13. Composition of claim 10 wherein said oily acid retarding agent has about ten to about twenty-six carbon atoms.

14. Composition of claim 10 wherein said oily acid gel breaker retarding agent comprises abietic acid.

15. Method of preparing a subterranean formation for production of hydrocarbons comprising fracturing said subterranean formation with a fracturing fluid comprising a gelled hydrocarbon fracturing fluid, a proppant, an alkaline earth metal oxide gel breaker, and an oily acid gel breaker retarding agent.

16. Method of claim 15 wherein said gel breaker is hard burned magnesium oxide.

17. Method of claim 15 wherein said oily acid gel breaker retarding agent comprises tall oil.

18. Method of claim 15 wherein the ratio of gel breaker to gel breaker retarding agent is about 1:0.4 to about 1:1.4 by weight.

19. Method of retarding the action of a gel breaker in a gelled hydrocarbon fracturing fluid comprising adding to said fracturing fluid an oily acid gel breaker retarding agent in an amount effective to retard said gel breaking action.

* * * * *